United States Patent
Higuchi

(10) Patent No.: US 8,401,581 B2
(45) Date of Patent: Mar. 19, 2013

(54) COMMUNICATION METHOD AND RADIO APPARATUS USING THE COMMUNICATION METHOD

(75) Inventor: Keisuke Higuchi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 329 days.

(21) Appl. No.: 12/934,779

(22) PCT Filed: Mar. 19, 2009

(86) PCT No.: PCT/JP2009/001252
§ 371 (c)(1),
(2), (4) Date: Oct. 22, 2010

(87) PCT Pub. No.: WO2009/119051
PCT Pub. Date: Oct. 1, 2009

(65) Prior Publication Data
US 2011/0053630 A1    Mar. 3, 2011

(30) Foreign Application Priority Data
Mar. 26, 2008   (JP) .................................. 2008-081925

(51) Int. Cl.
*H04Q 7/20*    (2006.01)

(52) U.S. Cl. ..... 455/509; 455/507; 455/515; 455/67.11; 455/441; 455/550.1; 370/328; 370/329; 370/343; 370/330

(58) Field of Classification Search .................. 455/509, 455/507, 515, 500, 517, 67.11, 115.1, 550.1, 455/422.1, 403, 423–425, 450–452.2, 575.1, 455/426.1, 426.2, 441; 370/328, 329, 343, 370/310
See application file for complete search history.

(56) References Cited

U.S. PATENT DOCUMENTS

| | | | |
|---|---|---|---|
| 5,396,645 A * | 3/1995 | Huff | 455/441 |
| 2006/0209669 A1* | 9/2006 | Nishio | 370/208 |

FOREIGN PATENT DOCUMENTS

| | | |
|---|---|---|
| JP | 2006-067236 | 3/2006 |
| JP | 2006-270941 | 10/2006 |
| JP | 2008-066780 | 3/2008 |

OTHER PUBLICATIONS

International Search Report issued in International Patent Application No. PCT/JP2009/001252 dated May 19, 2009.
Transmittal of Translation of the International Preliminary Report on Patentability and Written Opinion issued in International Application No. PCT/JP2009/001252 dated Mar. 19, 2009.

\* cited by examiner

*Primary Examiner* — Keith Ferguson
(74) *Attorney, Agent, or Firm* — McDermott Will & Emery LLP

(57) ABSTRACT

A control unit allocates sequentially a channel for use in data transmission and a channel for use in channel estimation used to acquire channel characteristics between a radio apparatus and another radio apparatus to be communicated with, to the another radio apparatus. A radio unit to an IF unit communicate with the another radio unit through the sequentially allocated data transmission channels, respectively. An acquisition unit acquires the traveling speed of the another radio apparatus in communication with the radio apparatus. A decision unit varies the frequency at which the channel for use in channel estimation is allocated, based on the traveling speed acquired.

4 Claims, 17 Drawing Sheets

FIG.4

| THRESHOLD VALUES | FREQUENCY |
|---|---|
| TRAVELING SPEED < A | X |
| A ≤ TRAVELING SPEED < B | Y (>X) |
| B ≤ TRAVELING SPEED | 0 |

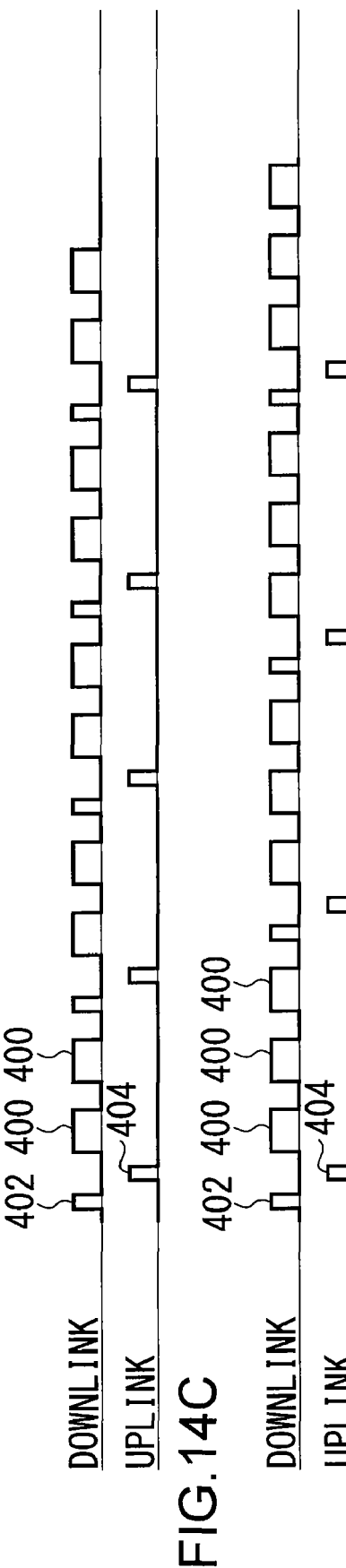

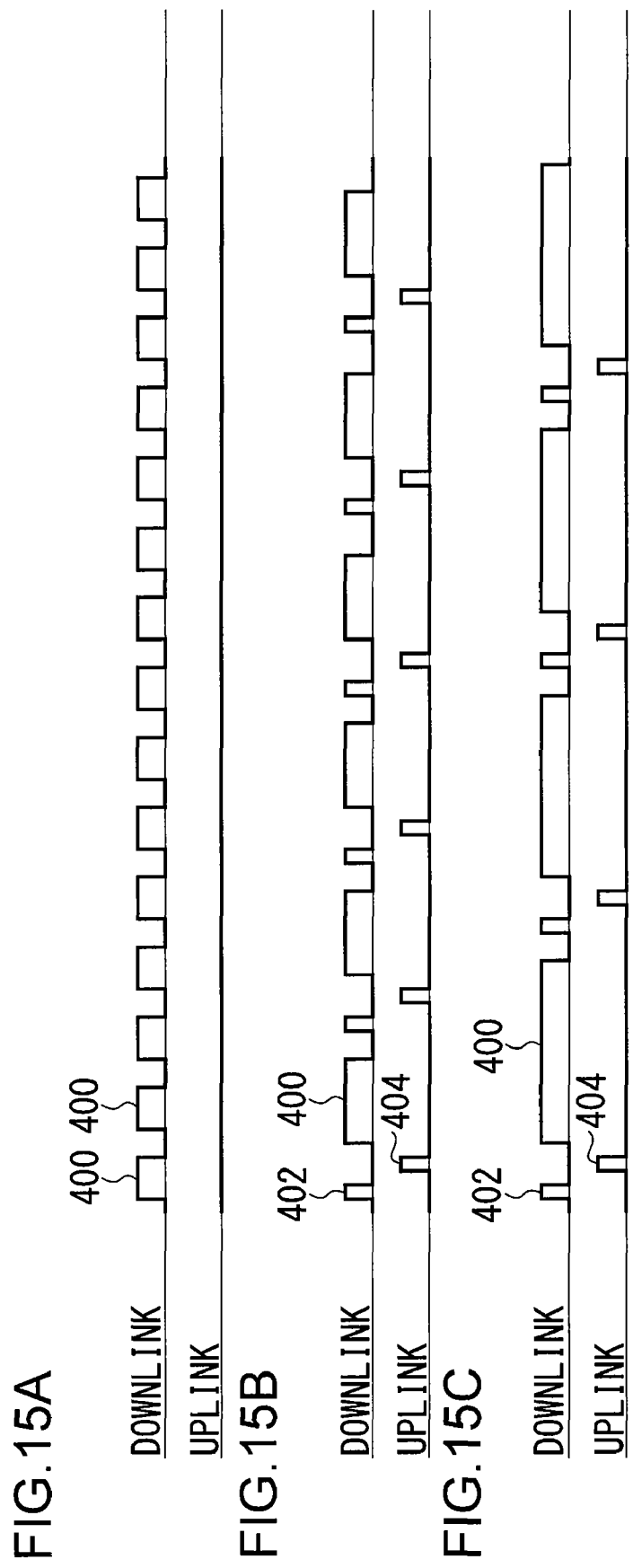

COMMUNICATION METHOD AND RADIO APPARATUS USING THE COMMUNICATION METHOD

RELATED APPLICATIONS

This application is the U.S. National Phase under 35 U.S.C. §371 of International Application No. PCT/JP2009/001252, filed on Mar. 19, 2009, which in turn claims the benefit of Japanese Application No. 2008-081925, filed on Mar. 26, 2008, the disclosures of which Applications are incorporated by reference herein.

TECHNICAL FIELD

The present invention relates to a communication technology, and it particularly relates to a communication method for transmitting a known signal used to estimate channel characteristics and a radio apparatus using said communication method.

BACKGROUND TECHNOLOGY

In a mobile communication system constituted by a radio base station and a radio mobile station, the radio base station assigns a channel to the radio mobile station as a resource. Also, the radio base station and the radio mobile station communicate with each other using the assigned channel (See Patent Document 1, for instance).

[Patent Document 1] Japanese Unexamined Patent Application Publication No. 2006-270941.

DISCLOSURE OF THE INVENTION

Problems to be Solved by the Invention

In wireless communications, it is generally desired that the limited frequency resources be used effectively. With a growing communication rate in particular, such a demand is ever increasing. One of technologies that meet this request is a technique called OFDMA (Orthogonal Frequency Division Multiple Access). This scheme can be combined with TDMA/TDD (TDMA: Time Division Multiple Access, TDD: Time Division Duplex). OFDMA is a technique where a plurality of terminal apparatuses are frequency-multiplexed using OFDM.

In OFDMA as mentioned above, a subchannel is formed by a plurality of subcarriers, and a multicarrier signal is formed by a plurality of sub-channels. The combining of the OFDMA scheme and the TDMA scheme allows the multicarrier signal to be divided into a plurality of time slots on the time axis. As a result, a base station apparatus performs data communication with a terminal apparatus by allocating a subchannel in at least one time slot to the terminal apparatus. On the other hand, instead of defining the subchannels and the time slots as described above, the base station apparatus may allocate a combination of at least one subcarrier and a predetermined time period in a frame (hereinafter referred to as "burst") to the terminal apparatus.

To further increase the communication rate and the enlarge the coverage, BF (Beam Forming) and MIMO (Multiple-Input Multiple-Output) proves effective. In MIMO, a transmitting apparatus and a receiving apparatus are each equipped with a plurality of antennas, and burst signals to be transmitted in parallel are set (hereinafter, each of data and the like to be transmitted in parallel in the burst signal is called "stream"). That is, streams up to the maximum number of antennas are set for the communications between the transmitting apparatus and the receiving apparatus. The directivity or directionality at the time of transmission is generally controlled in BF and MIMO.

In order to enhance the directivity control, the estimation of channel characteristics is desired. However, transmitting a known signal (hereinafter referred to as "sounding signal") used to estimate the channel characteristics may cause a drop in transmission efficiency. Although an estimation result is fed back when the channel characteristics are estimated in a receiving side, this feedback operation leads to a drop in transmission efficiency. At the same time, the channel characteristics vary, so that the directivity control following the channel characteristics is not performed when the frequency at which the sounding signal is transmitted is low. As a result, the communication quality may degrade.

The present invention has been made in view of such circumstances and a purpose thereof is to provide a communication technique that suppresses the degradation of communication quality while suppressing a drop in channel efficiency.

Means for Solving the Problems

In order to resolve the above problems, a radio apparatus according to an embodiment of the present invention comprises: an allocation unit configured to sequentially allocate a channel for use in data transmission and a channel for use in channel estimation used to acquire channel characteristics between the radio apparatus and another radio apparatus to be communicated therewith, to the another radio apparatus; a communication unit configured to communicate with the another radio unit through the data transmission channels sequentially allocated by the allocation unit, respectively; and an acquisition unit configured to acquire a relative traveling speed between the radio apparatus and the another radio apparatus communicating in the communication unit. The communication unit varies the frequency at which the channel for use in channel estimation is allocated, based on the relative traveling speed acquired by the acquisition unit.

Another embodiment of the present invention relates to a communication method. The method comprises: allocating sequentially a channel for use in data transmission and a channel for use in channel estimation used to acquire channel characteristics between a radio apparatus and another radio apparatus to be communicated therewith, to the another radio apparatus; communicating with the another radio unit through the data transmission channels sequentially allocated, respectively; acquiring a relative traveling speed between the radio apparatus and the another radio apparatus communicating with the radio apparatus; and varying the frequency at which the channel for use in channel estimation is allocated, based on the acquired relative traveling speed.

Optional combinations of the aforementioned constituting elements, and implementations of the invention in the form of methods, apparatuses, systems, recording media, computer programs and so forth may also be practiced as additional modes of the present invention.

Effect of the Invention

The present invention suppresses the degradation of communication quality while suppressing a drop in channel efficiency.

BRIEF DESCRIPTION OF THE DRAWINGS

FIG. 4 illustrates a data structure of a table stored in a storage of FIG. 3.

FIG. 12(c) illustrates a structure of a frame in a communication system according to a modification of the exemplary embodiment.

FIGS. 14(a) to 14(c) each shows a transmit timing of packet in a communication system according to another modification of the exemplary embodiment.

FIGS. 15(a) to 15(c) each shows a transmit timing of packet in a communication system according to still another modification of the exemplary embodiment.

DESCRIPTION OF THE REFERENCE NUMERALS

Figure 1:
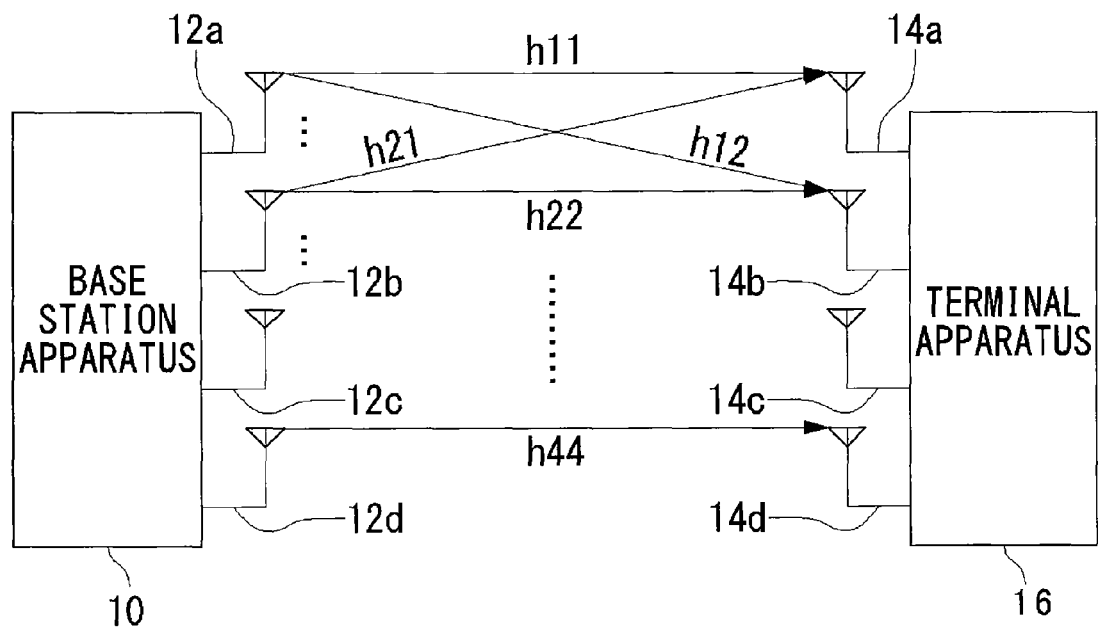
FIG. 1 illustrates a structure of a communication system according to an exemplary embodiment of the present invention.

10 Base station apparatus
12 Antennas
14 Antennas
16 Terminal apparatus
20 Radio unit
22 Baseband processing unit
24 Modem unit
26 IF unit
30 Control unit
32 Storage
34 Acquisition unit
36 Decision unit
50 Receiving processing unit
52 Transmitting processing unit
66 Distribution unit
68 IFFT unit
74 FFT unit
76 Weight vector derivation unit
80 Combining unit
100 Communication system

BEST MODE FOR CARRYING OUT THE INVENTION

An outline of the present invention will be given before a specific description thereof. An exemplary embodiment of the present invention relates to a communication system comprised of a base station apparatus and at least one terminal apparatus. It is assumed herein that the communication system complies with the IEEE 802.16 standard. Accordingly, the base station apparatus assigns a burst to a terminal apparatus and communicates with the terminal apparatus. The allocation of bursts in an uplink and the allocation of bursts in a downlink are asymmetrical in most cases. In the communication system, on the other hand, MIMO may be achieved. That is, a burst is formed of multiple streams. Under these circumstances, a sounding signal or an estimation result in the terminal apparatus is fed back. In order to suppress the degradation of communication quality while suppressing the degradation of channel efficiency caused by the transmission of the sounding signal and feedback of the estimation result, the communication system according to the present exemplary embodiment performs the following processing.

The base station apparatus acquires the traveling speed of the terminal apparatus. The base station apparatus defines beforehand a low speed, a medium speed, and a high speed relative to the traveling speed of the terminal apparatus and classifies the thus acquired traveling speed thereof into any one of the three speed ranges. The base station apparatus defines the frequency at which the sounding signal is transmitted or the frequency at which the estimation result is fed back for the low speed, the medium speed, and the high speed, respectively. For example, the transmitting frequency is defined such that the transmitting frequency of low speed is higher than that of medium speed and such that the transmitting frequency of high speed is set to "0". The base station apparatus specifies the transmitting frequency according to the classified range of traveling speed. Finally, the sounding signal or estimation result is transmitted, between the base station apparatus and the terminal apparatus, at the specified transmitting frequency.

FIG. 1 illustrates a structure of a communication system 100 according to an exemplary embodiment of the present invention. The communication system 100 includes a base station apparatus 10 and a terminal apparatus 16. The base station apparatus 10 includes a first antenna 12a, a second antenna 12b, a third antenna 12c and a fourth antenna 12d, which are generically referred to as "antenna 12" or "antennas 12". The terminal apparatus 16 includes a first antenna 14a, a second antenna 14b, a third antenna 14c and a fourth antenna 14d, which are generically referred to as "antenna 14" or "antennas 14".

An outline of a MIMO system will be explained as a structure of the communication system 100. Assume herein that data are being transmitted from the base station apparatus 10 to the terminal apparatus 16. The base station apparatus 10 transmits data of multiple streams from the first antenna 12a through the fourth antenna 12d, respectively. As a result, the data rate becomes higher. The terminal apparatus 16 receives the data of multiple streams by the first antenna 14a through the fourth antenna 14d. Further, the terminal apparatus 16 separates the received data by adaptive array signal processing and demodulates independently the data of multiple streams. Since the number of antennas 12 is "4" and the number of antennas 14 is also "4" here, the number of combinations of channels between the antennas 12 and the antennas 14 is "16".

Figure 2:
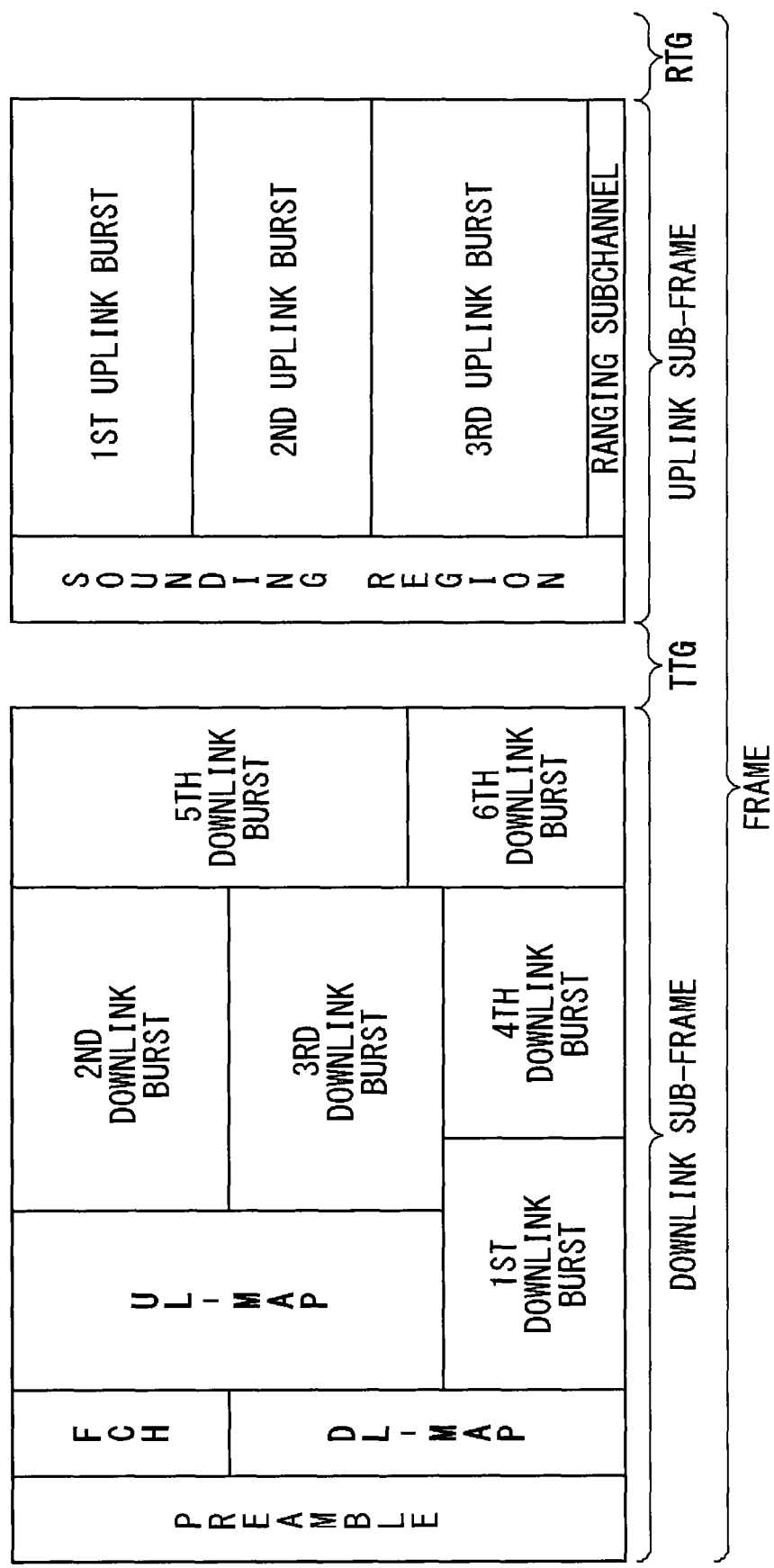
FIG. 2 shows a structure of a frame in the communication system of FIG. 1.

The channel characteristic between from the ith antenna $12i$ to the jth antenna $14j$ is denoted by $h_{ij}$. In FIG. 2, the channel characteristic between the first antenna 12a and the first antenna 14a is denoted by $h_{11}$, that between from the first antenna 12a to the second antenna 14b by $h_{12}$, that between the second antenna 12b and the first antenna 14a by $h_{21}$, that between from the second antenna 12b to the second antenna 14b by $h_{22}$, and that between from the fourth antenna 12d to the fourth antenna 14d by $h_{44}$. For the clarity of illustration, the other channels are omitted in FIG. 2. It is assumed herein that the base station apparatus 10 is executing beamforming. Accordingly, the sounding signal is transmitted from the terminal apparatus 16 to the base station apparatus 10 to estimate the channel characteristics in the base station apparatus 10. Or, in order to feed back the channel characteristics estimated by the terminal apparatus 16 to the base station apparatus 10, a signal for use in channel estimation is transmitted from the base station apparatus 10 to the terminal apparatus 16, and the estimation result is transmitted from the terminal apparatus 16 to the base station apparatus 10.

That is, in the following description, the base station apparatus 10 determines the transmit timing of the sounding signal or the estimation result, and the terminal apparatus 16 transmits the sounding signal or feeds back the estimation result according to the decision made by the base station apparatus 10.

FIG. 2 shows a structure of a frame in the communication system 100. The vertical axis in FIG. 2 corresponds to frequency, whereas the horizontal axis corresponds to time. As described above, OFDMA is used, so that the frequency in the vertical axis corresponds to subcarriers. Each frame is formed by a downlink sub-frame, TTG (Transmit/Receive Transition Gap), an uplink sub-frame, and RTG (Receive/Transmit Transition Gap). The downlink sub-frame starts with a preamble, namely a known signal. The preamble is followed by FCH. FCH contains DLFP (Downlink Frame Prefix), the MCS (Modulation and Coding Scheme) level of DLFP, and the length of DL-MAP.

DL-MAP contains positional information on each downlink burst contained in the sub-frame and map information such as a modulation scheme. Here, the positional information on a downlink burst is indicated by a combination of subcarrier and time. Also, UL-MAP contains positional information on each uplink burst contained in the sub-frame and map information such as a modulation scheme. Following these, the downlink sub-frame contains a plurality of downlink bursts. The assignment of the plurality of bursts is determined by DL-MAP. In such a structure described as above, a first downlink burst to a sixth downlink burst and a first uplink burst to a third uplink burst are allocated to the terminal apparatus 16. A sounding region will be explained later, and the description of a ranging subchannel will be omitted.

Figure 3:
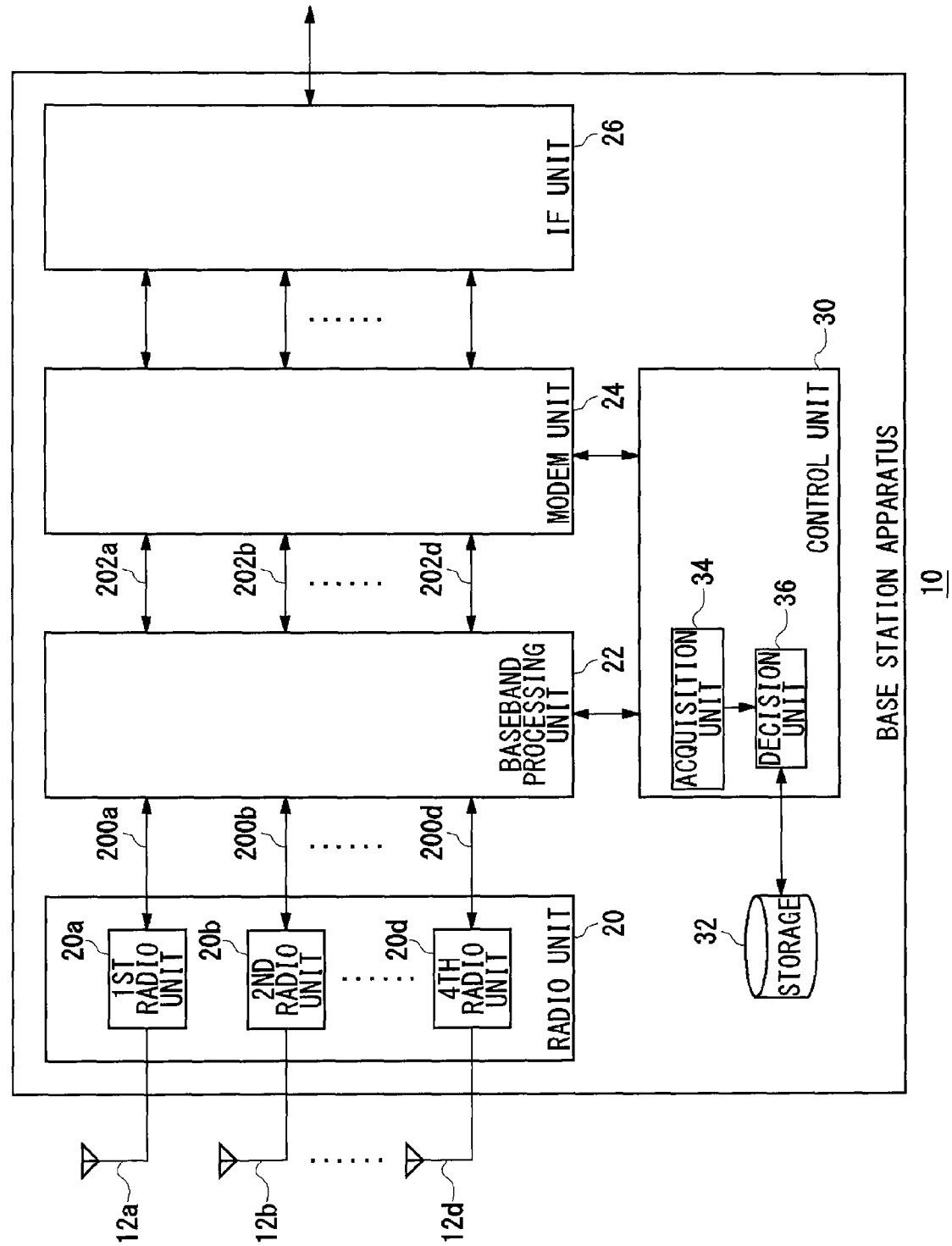
FIG. 3 illustrates a structure of a base station apparatus of FIG. 1.

FIG. 3 illustrates a structure of the base station apparatus 10. The base station apparatus 10 includes a first antenna 12a, a second antenna 12b, . . . , and a fourth antenna 12d, which are generically referred to as "antenna 12" or "antennas 12", a first radio unit 20a, a second radio unit 20b, . . . , and a fourth radio unit 20d, which are generically referred to as "radio unit 20" or "radio units 20", a baseband processing unit 22, a modem unit 24, an IF unit 26, a control unit 30, and a storage 32. The control unit 30 includes an acquisition unit 34 and a decision unit 36. Signals involved include a first time-domain signal 200a, a second time-domain signal 200b, . . . , and a fourth time-domain signal 200d, which are generically referred to as "time-domain signal 200" or "time-domain signals 200", and a first frequency-domain signal 202a, a second frequency-domain signal 202b, . . . , and a fourth frequency-domain signal 202d, which are generically referred to as "frequency-domain signal 202" or "frequency-domain signals 202".

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included in the radio unit 20.

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. That is, the radio units 20 transmits radio-frequency packet signals from the antennas 12. A PA (Power Amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 into those in the frequency domain, respectively, and performs adaptive array signal processing on the frequency-domain signals. The baseband processing unit 22 outputs the result of adaptive array signal processing as the frequency-domain signals 202. A frequency-domain signal 202 corresponds to each of a plurality of streams transmitted. Note that the adaptive array signal processing is performed in units of stream. The number of frequency-domain signals 202 is determined by the number of streams. Though the baseband processing unit 22 derives a weight vector in the adaptive array signal processing, a sounding signal assigned in a sounding region may be used to derive the weight vector.

As a transmission operation, the baseband processing unit 22 receives the input of frequency-domain signals 202 from the modem unit 24 as signals in the frequency domain, converts signals in the frequency domain into those in the time domain, and outputs them as the time-domain signal 200 by associating them with a plurality of antennas 12, respectively. It is assumed that the number of antennas 12 to be used in the transmission processing is specified by the control unit 30. The frequency-domain signal 202, which is a signal in the frequency domain, contains a plurality of subcarriers. For clarity of the figure, however, the frequency-domain signal is presented here as a single signal line.

As a receiving operation, the modem unit 24 demodulates and deinterleaves the frequency-domain signal 202 outputted from the baseband processing unit 22. The demodulation is carried out in units of subcarrier. The modem unit 24 outputs the demodulated signal to the IF unit 26. As a transmission processing, the modem unit 24 carries out interleaving. The modem unit 24 outputs the modulated signal to the baseband processing unit 22 as a frequency-domain signal 202. When the transmission processing is carried out, the modulation scheme is specified by the control unit 30.

As a receiving processing, the IF unit 26 combines signals outputted from a plurality of modem units 24 and then forms one data stream for each burst. Then the IF unit 26 decodes the combined data stream. The IF unit 26 outputs the decoded data stream. As a transmission processing, the IF unit 26 receives the input of one data stream for each burst, encodes it and then separates it. Then, the IF unit 26 outputs the thus separated data to a plurality of modem units 24. It is assumed that the coding rate is specified by the control unit 30 at the time of transmission processing. Here, an example of the coding is convolutional coding, whereas an example of decoding is Viterbi decoding.

The control unit 30 controls the timing and the like of the base station apparatus 10. The control unit 30 sequentially assigns bursts to a not-shown terminal apparatus 16. The assignment result is as shown in FIG. 2. Prior to the assignment of the bursts, the control unit 30 performs ranging, authentication, key exchange and registration via the radio units 20, the baseband processing unit 22, the modem unit 24 and the IF unit 26 (hereinafter simply described as "via the radio units 20 to the IF unit 26" also). However, a known technique may be used to perform these processes and therefore the repeated description thereof is omitted here.

The acquisition unit 34 acquires the traveling speed of the terminal apparatus 16, which is in communication with the base station 10, via the radio units 20 to the IF unit 26. Here, the traveling speed thereof is acquired in many ways that are principally divided into the following two cases (1) and (2).

(1) A case where the traveling speed thereof is estimated by the base station apparatus 10 itself.

(2) A case where the result estimated by the terminal apparatus 16 is received.

In the case of (1), for example, the baseband processing unit 22 derives a frequency response, based on the burst signal sent from the terminal apparatus 16 and then the acquisition unit 34 derives the traveling speed, based on the temporal variation of the frequency response over a plurality of burst signals. Also, the acquisition unit 34 may acquire the weight vector from the baseband processing unit 22, and may derive the traveling speed, based on the temporal variation of the weight vector over a plurality of burst signals.

To achieve (2), information by which to convey the traveling speed is contained in a burst signal sent to the base station apparatus 10 from the terminal apparatus 16. In the terminal apparatus 16, too, the similar processing to that performed by the acquisition unit 34 is performed so as to derive the traveling speed. Also, the terminal apparatus 16 may derive the traveling speed, based on the temporal variation of received power and the error occurrence. For example, as the error occurs more often, it is estimated that the traveling speed is faster.

The storage 32 defines a relation such that if the traveling speed is lower than a threshold value, the frequency increases whereas if the traveling speed is greater than or equal to the threshold value, the frequency decreases according as the traveling speed increases. The frequency is defined as the number of transmissions of sounding signal within a predetermined period of time. This corresponds to the maximum value of a cycle at which the sounding signal is to be transmitted. FIG. 4 illustrates a data structure of a table stored in the storage 32. The table includes a threshold value column 210 and a frequency column 212. As shown in the threshold value column 210, two threshold values "A" and "B" are defined beforehand, and the relation A<B is set. Note that the aforementioned threshold value corresponds to the threshold value "B".

As defined in the threshold value column 210, the traveling speed is sorted into one of three stages. The three stages are called "low speed", "medium speed" and "high speed" from top to bottom in this order. Frequency values corresponding respectively to the three stages are stored in the frequency column 212. That is, the frequency "X" is defined for a low speed case, and the frequency "Y" is defined for a medium speed case. Since the relation is Y>X here, the frequency increases as a low speed shifts to a medium speed. Also, the frequency "0" is defined for a high speed case. In other words, if the speed becomes high, the sounding signal will not be transmitted. Therefore this corresponds to a case where the frequency is lower than the medium and low speed cases.

If the traveling speed becomes low, the variation in channel characteristics will be smaller as well. In this case, the weight vector once derived may be used over a plurality of frames. Thus, lowering the frequency at which the sounding signal is transmitted suppresses a drop in transmission efficiency. If, on the other hand, the traveling speed becomes medium, the variation in channel characteristics will be larger as compared with the low speed case. As a result, the period during which the once-derived weight vector is usable becomes shorter. Accordingly, in a medium speed case, the frequency at which the sounding signal is transmitted is set higher. As a result, the follow-up to the variation in channel characteristics is enabled and thereby the degradation of communication quality is suppressed. If, on the other hand, the traveling speed becomes high, the variation in channel characteristics will be larger as compared with the medium speed case. As a result, the channel characteristic greatly varies within the same frame. Accordingly, in a high speed case, stopping the MIMO and BF suppresses the degradation of transmission quality. Since the MIMO and BF are stopped, the transmission of sounding signal is no longer required and therefore the degradation of transmission efficiency is suppressed. Now, refer back to FIG. 3.

While referencing the table stored in the storage 32, the decision unit 36 determines the frequency at which the sounding signal is transmitted, based on the traveling speed acquired by the acquisition unit 34. That is, the decision unit 36 changes the frequency at which a sounding region is assigned, based on the traveling speed acquired by the acquisition unit 34. The control unit 30 has the sounding signal transmitted according to the decision made by the decision unit 36. Instead of the sounding signal, the channel characteristics estimated in the terminal apparatus 16 (hereinafter referred to as "estimation result") may be received from the terminal apparatus 16 and thereby the baseband processing unit 22 may derive a weight vector based on the estimation result. In so doing, the decision unit 36 determines the frequency at which the estimation result is fed back, based on the traveling speed acquired by the acquisition unit 34

The baseband processing unit 22 receives the sounding signal from the not-shown terminal apparatus 16 via the radio units 20. As described above, the baseband processing unit 22 derives the weight vector, based on the sounding signal. A known technique may be used in the derivation of the weight vector and therefore the description thereof is omitted here.

This structure may be implemented hardwarewise by elements such as a CPU, memory and other LSIs of an arbitrary computer, and softwarewise by memory-loaded programs having communication functions or the like. Depicted herein are functional blocks implemented by cooperation of hardware and software. Therefore, it will be obvious to those skilled in the art that the functional blocks may be implemented by a variety of manners including hardware only, software only or a combination of both.

Figure 5:
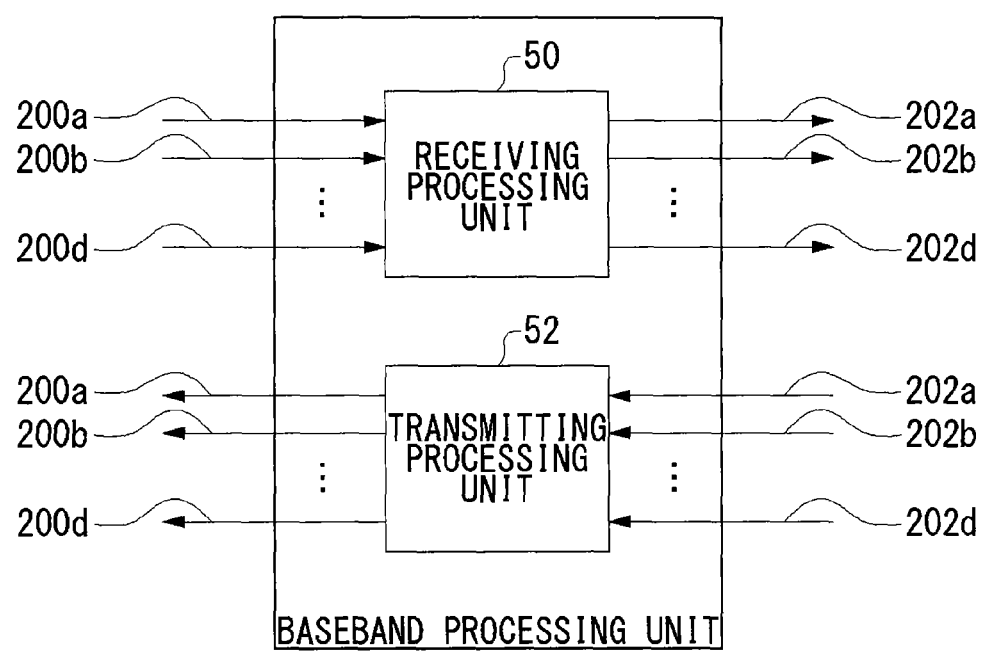
FIG. 5 illustrates a structure of a baseband processing unit of FIG. 3.

FIG. 5 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations in the baseband processing unit 22. That is, the receiving processing unit 50 performs adaptive array signal processing on time-domain signals 200 and therefore derives receiving weight vectors of the time-domain signal 200. Also, the receiving processing unit 50 outputs the result of array synthesis as the frequency-domain signal 202. The receiving processing unit 50 estimates the above-described channel characteristics, based on the frequency-domain signal 202 corresponding to a signal for channel estimation. In this case, the channel characteristic is a channel characteristic on a subcarrier-by-subcarrier basis.

The transmitting processing unit 52 executes a part, corresponding to a transmission operation, of operations in the baseband processing unit 22. The transmitting processing unit 52 derives transmitting weight vectors, based on the channel characteristics and carries out beamforming by the derived weight vectors. The receiving processing unit 50 converts the frequency-domain signal 202 so as to generate the time-domain signal 200. The transmitting processing unit 52 outputs finally the time-domain signals 200.

Figure 6:
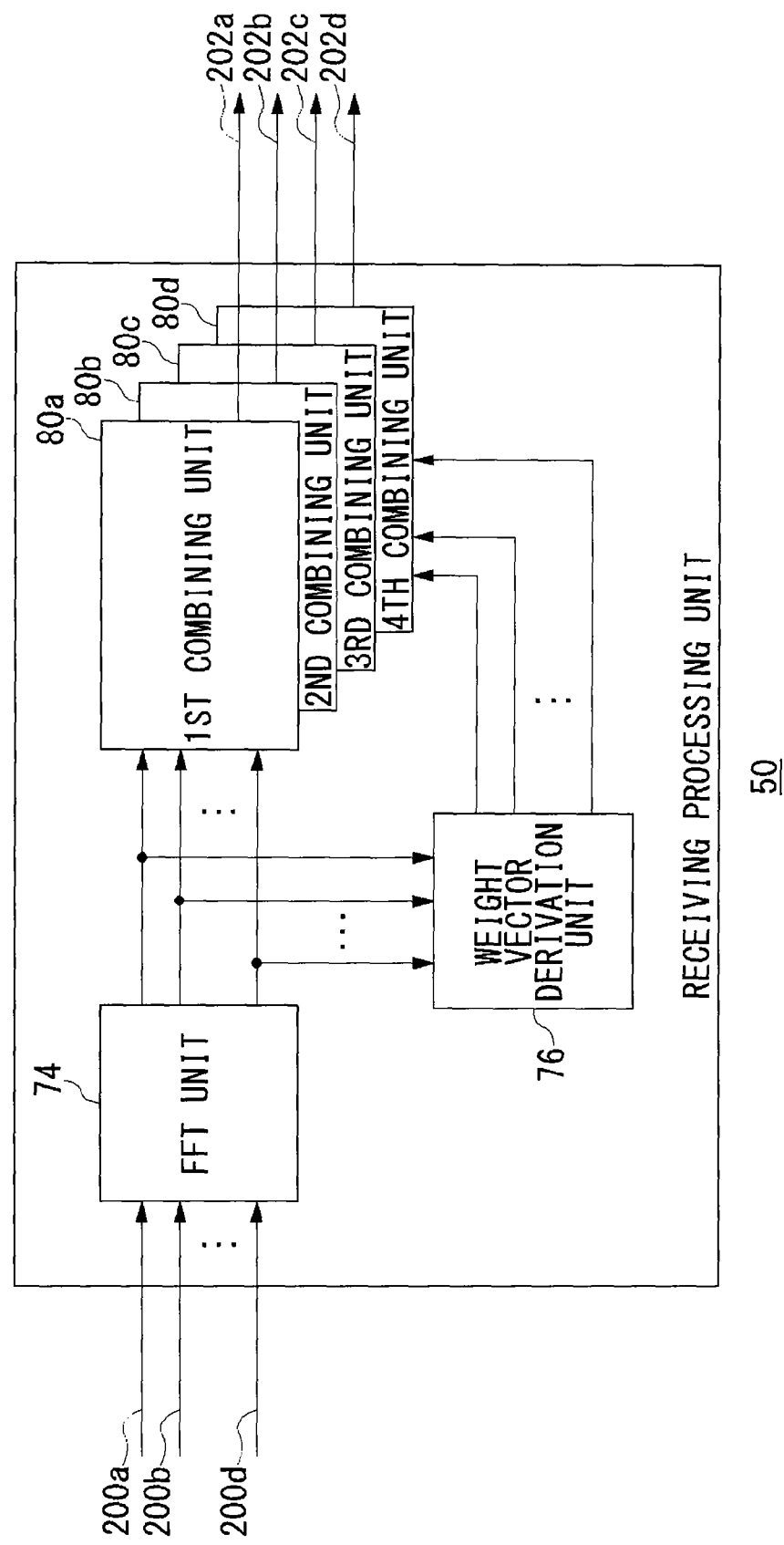
FIG. 6 illustrates a structure of a receiving processing unit of FIG. 5.

FIG. 6 illustrates a structure of the receiving processing unit 50. The receiving processing unit 50 includes an FFT unit 74, a weight vector derivation unit 76, and a first combining unit 80a, a second combining unit 80b, a third combining unit 80c and a fourth combining unit 80d, which are generically referred to as "combining unit 80" or "combining units 80".

The FFT unit 74 performs FFT on the time-domain signal 200 so as to convert the time-domain signal 200 into a frequency-domain value. It is assumed herein that a frequency-domain value for one time-domain signal 200 is outputted via one signal line.

The weight vector derivation unit 76 derives a weight vector from the frequency-domain value, on a subcarrier-by-subcarrier basis. The weight vector is so derived as to correspond to each of a plurality of streams, and a weight vector for one stream contains factors corresponding to the number of antennas 12, for each subcarrier. To derive a weight vector corresponding to a plurality of streams, an adaptive algorithm may be used or channel characteristics may be used. Since a known technique may be employed in such processings, the explanation thereof is omitted here. Finally, weights are derived wherein the number of weights equals the number resulting from the multiplication of the number of subcarriers, the number of antennas 12 and the number of streams. Note that the weight vector derivation unit 76 derives the weight vector and derives also the channel characteristic in units of subcarrier. The channel characteristic per subcarrier is derived for between each antenna 12 of the terminal apparatus 16 and each stream.

The combining unit 80 combines the frequency-domain value converted by the FFT unit 74 and the weight vector from the weight vector derivation unit 76. For example, as the weight vector to which a multiplication is to be executed, a weight which corresponds to both one subcarrier and the first stream is selected from among the weight vectors derived from the weight vector derivation unit 76. The selected weight has a value corresponding to each antenna 12.

As another weight vector to which a multiplication is to be executed, a value corresponding to one subcarrier is selected from among the frequency-domain values converted by the FFT unit 74. The selected value contains a value corresponding to each antenna 12. Note that both the selected weight and the selected value belong to the same subcarrier. While being associated respectively with the antennas 12, the selected weight and the selected value are respectively multiplied and the multiplication results are summed up. With the summation of the multiplication results, a value corresponding to one subcarrier in the first stream is derived. In the first combining unit 80a, the above-described processing is performed on the other subcarriers so as to derive data corresponding to the first stream. The similar processing is carried out to derive data corresponding respectively to the second to fourth streams in the second combining unit 80b to the fourth combining unit 80d. The derived first to fourth streams are outputted as the first frequency-domain signal 202a to the fourth frequency-domain signal 202d, respectively.

Figure 7:
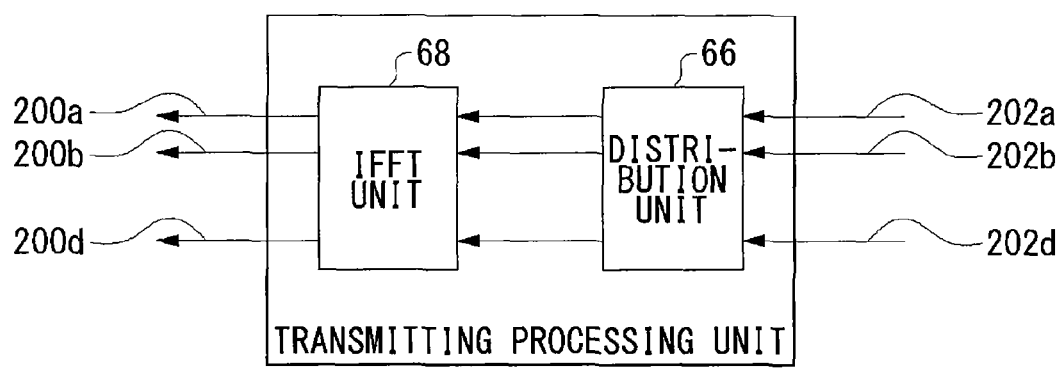
FIG. 7 illustrates a structure of a transmitting processing unit of FIG. 5.

FIG. 7 illustrates a structure of the transmitting processing unit 52. The transmitting processing unit 52 includes a distribution unit 66 and an IFFT unit 68. The distribution unit 66 associates the frequency-domain signals 202 with the antennas 12. Using a known technique, the distribution unit 66 derives weight vectors from the channel characteristics. The distribution unit 66 associates the frequency-domain signals 202 with the antennas 12 by multiplying the weight vectors by the frequency-domain signals. The IFFT unit 68 performs IFFT on the signals from the distribution unit 66 so as to generate the time-domain signal 200.

Figure 8:
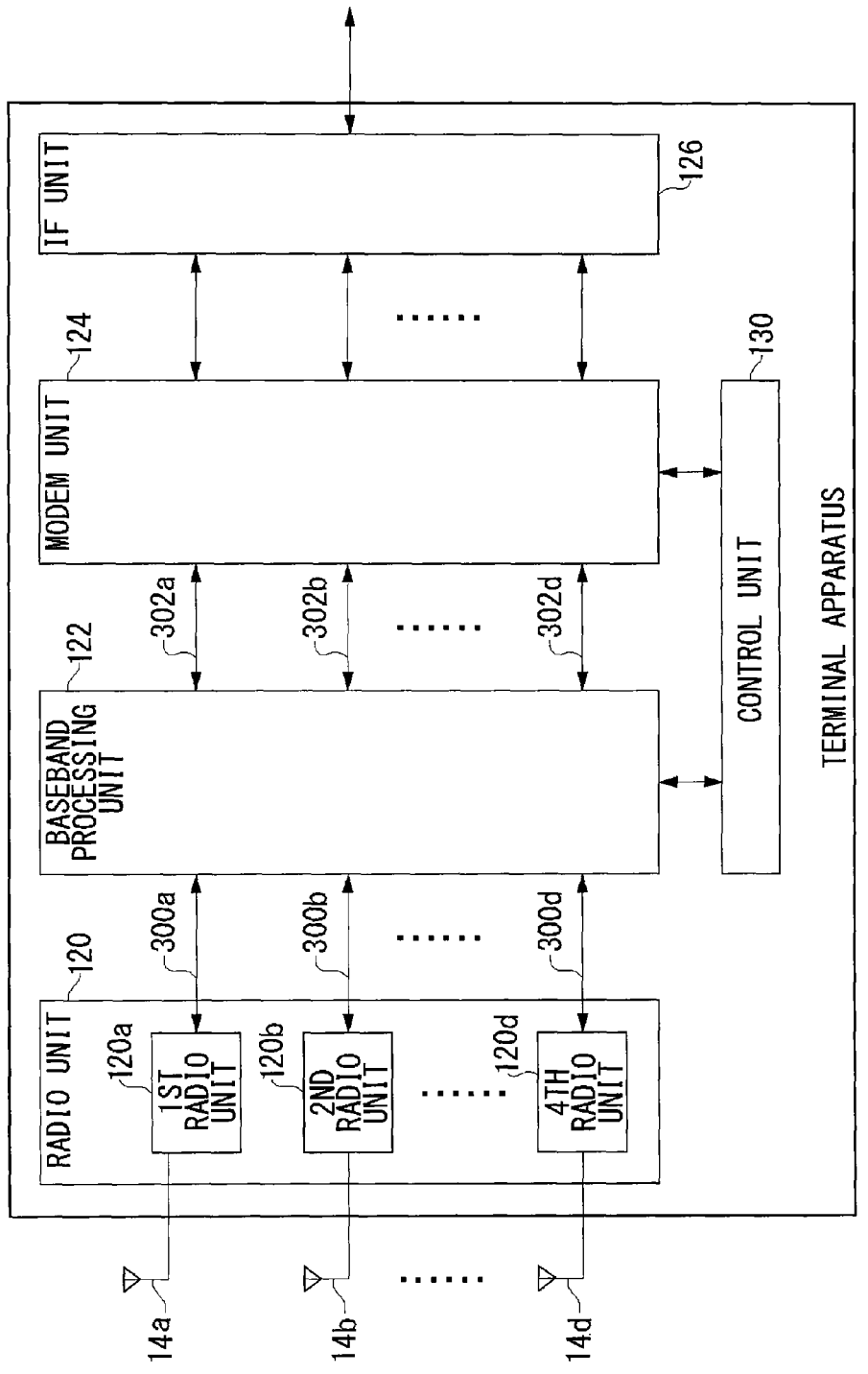
FIG. 8 illustrates a structure of a terminal of FIG. 1.

FIG. 8 illustrates a structure of the terminal apparatus 16. The terminal apparatus 16 includes a first antenna 14a, a second antenna 14b, ..., and a fourth antenna 14d, which are generically referred to as "antenna 14" or "antennas 14", a first radio unit 120a, a second radio unit 120b, ..., and a fourth radio unit 120d, which are generically referred to as "radio unit 120" or "radio units 120", a baseband processing unit 122, a modem unit 124, an IF unit 126, a control unit 130. Signals involved include a first time-domain signal 300a, a second time-domain signal 300b, ..., and a fourth time-domain signal 300d, which are generically referred to as "time-domain signal 300" or "time-domain signals 300", and a first frequency-domain signal 302a, a second frequency-domain signal 302b, ..., and a fourth frequency-domain signal 302d, which are generically referred to as "frequency-domain signal 302" or "frequency-domain signals 302".

The antenna 14, the radio unit 120, the baseband processing unit 122, the modem unit 124 and the IF unit 126 correspond respectively to the antenna 12, the radio unit 20, the baseband processing unit 22, the modem unit 24 and the IF unit 26 of FIG. 3. The terminal apparatus 16 performs the aforementioned processing on the bursts, FCH and the like assigned by the base station apparatus 10, in a frame as shown in FIG. 2. Also, the terminal apparatus 16 transmits the sounding signal in the sounding region, according to instructions received from the base station apparatus 10. If, on the other hand, the estimation result is to be fed back, upon receipt of the burst signals the baseband processing unit 122 will estimate the channel characteristics from the thus received burst signals. As described above, any known technique may be used to estimate the channel characteristics and therefore the description thereof is omitted here. The antenna 12 outputs the estimation result to the control unit 130. The control unit 130 has the received estimation result contained in the burst signals, and transmits the burst signals to the base station apparatus 10, using the allocated busts via the IF unit 126, the modem unit 124, the baseband processing unit 122 and the radio unit 120.

Figure 9:
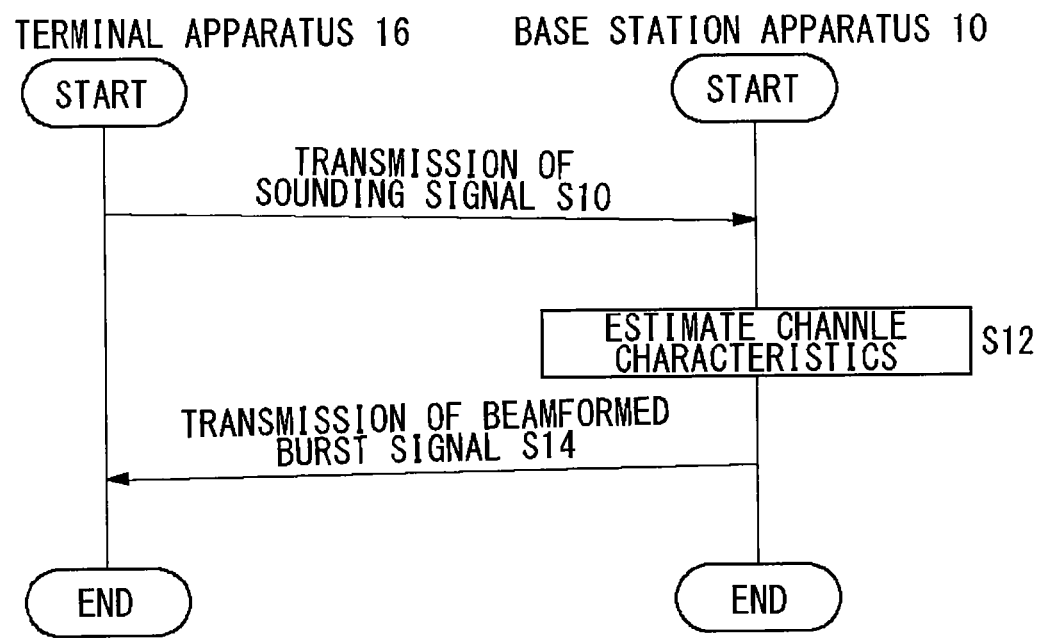
FIG. 9 is a sequence diagram showing a communication procedure in the communication system of FIG. 1.

An operation of the communication system 100 configured as above is now described. FIG. 9 is a sequence diagram showing a communication procedure in the communication system. The terminal apparatus 16 transmits a sounding signal to the base station apparatus 10 (S10). The base station apparatus 10 estimates a channel characteristic, based on the sounding signal (S12). The base station apparatus 10 generates a weight vector, based on the channel characteristic and transmits the burst signal, which has undergone beamforming by the weight vector, to the terminal apparatus 16 (S14).

Figure 10:
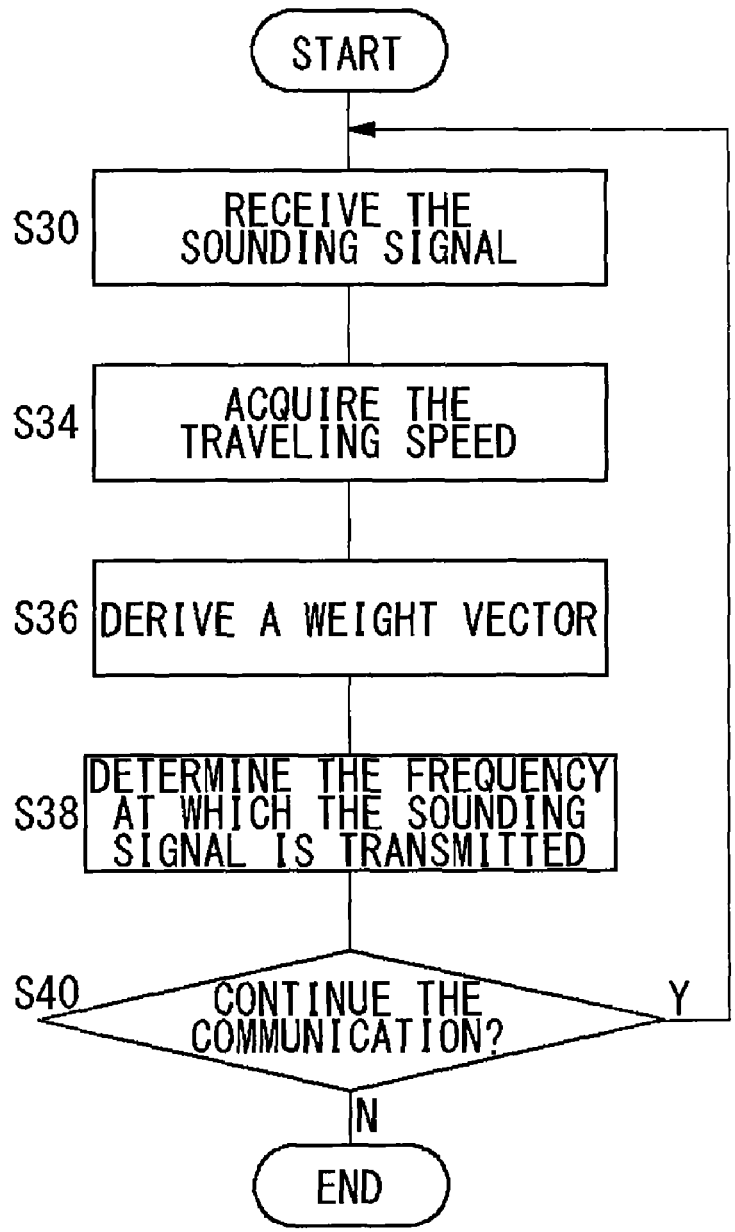
FIG. 10 is a flowchart showing a communication procedure in the base station apparatus of FIG. 3.

FIG. 10 is a flowchart showing a communication procedure in the base station apparatus. The IF unit 26, the modem unit 24, the baseband processing unit 22 and the radio unit 20 receive the sounding signal (S30). The acquisition unit 34 acquires the traveling speed (S34). The baseband processing unit 22 derives a weight vector from the sounding signal (S36)

and performs beamforming. The decision unit 36 determines the frequency at which the sounding signal is transmitted, based on the traveling speed (S38). If the communication is to continue (Y of S40), return to Step S30. If, on the other hand, the communication is not to continue (N of S40), the processing will be terminated.

Figure 11:
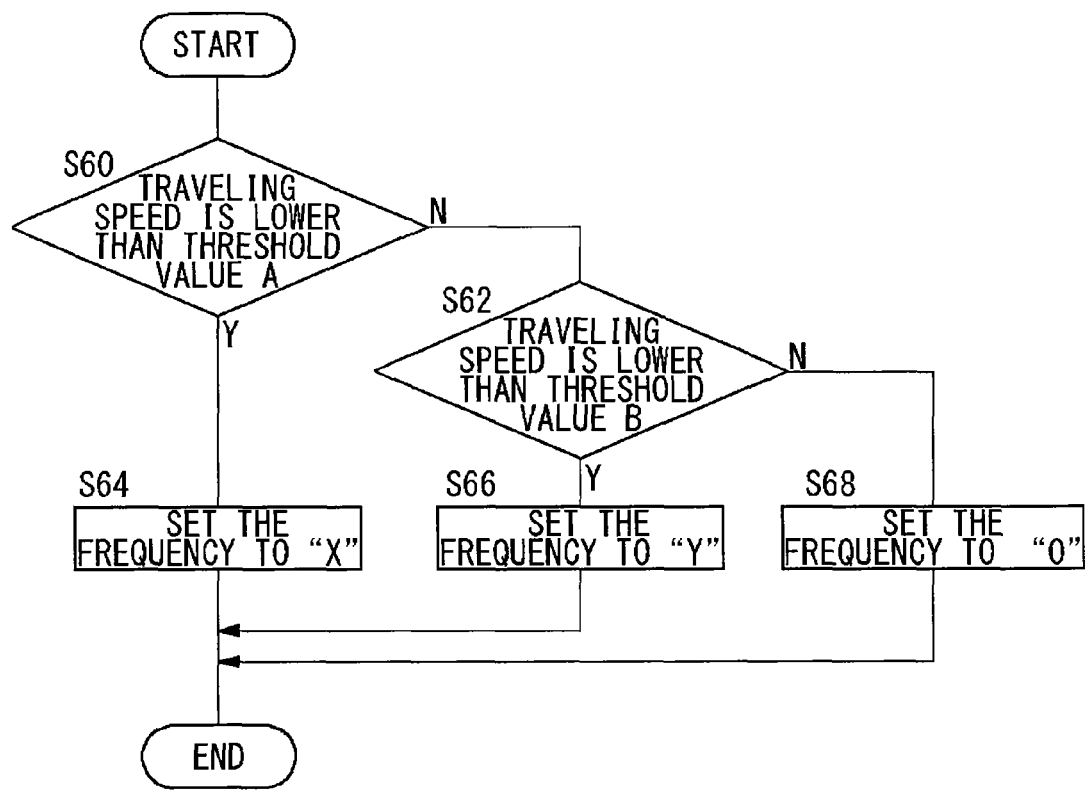
FIG. 11 is a flowchart showing a procedure for setting the frequency in the base station apparatus of FIG. 3.

FIG. 11 is a flowchart showing a procedure for setting the frequency in the base station apparatus. The processing carried out here corresponds to Step S38 of FIG. 10. If the traveling speed is lower than threshold value "A" (Y of S60), the decision unit 36 will set the frequency to "X" (S64). If, on the other hand, the traveling speed is not lower than threshold value "A" (N of S60) and lower than threshold value "B" (Y of S62), the decision unit 36 will set the frequency to "Y" (S66). If the traveling speed is not lower than threshold value "B" (N of S62), the decision unit 36 will set the frequency to "0" (S68)

A description is now given of modifications of the exemplary embodiment. In the exemplary embodiment, it is assumed that the communication system 100 complies with the IEEE 802.16 standard. In the modifications, a subchannel block is formed by fixed subcarriers. Also, the allocation of subchannel blocks in the uplink and the allocation thereof in the downlink are symmetrical with each other. The structure of the communication system 100 according to the modification is of a type similar to that of the communication system 100 of FIG. 1. Also, the structure of the base station apparatus 10 according to the modification is of a type similar to that of the base station apparatus 10 of FIG. 3, and the structure of the terminal apparatus 16 according to the modification is of a type similar to that of the terminal apparatus 16 of FIG. 8. Since the subchannel blocks in the modification correspond to the bursts in the exemplary embodiment, the description so far applies also to the modification. In what is to follow, a description is mainly given of the structure of a frame in the modification and differences from the exemplary embodiment.

Figure 12A:
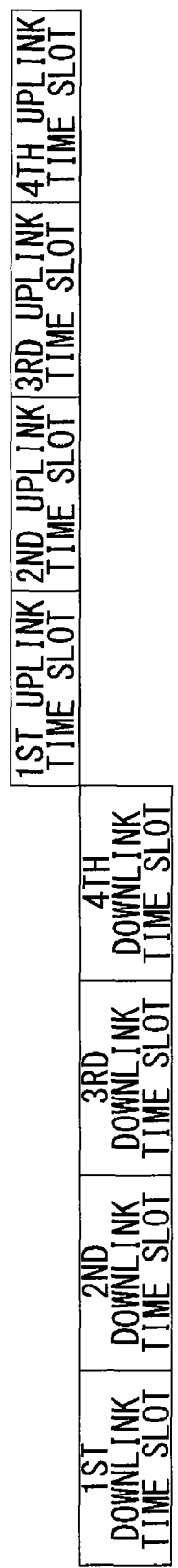
FIG. 12(a) illustrates a structure of a frame in a communication system according to a modification of the exemplary embodiment.
Figure 12B:
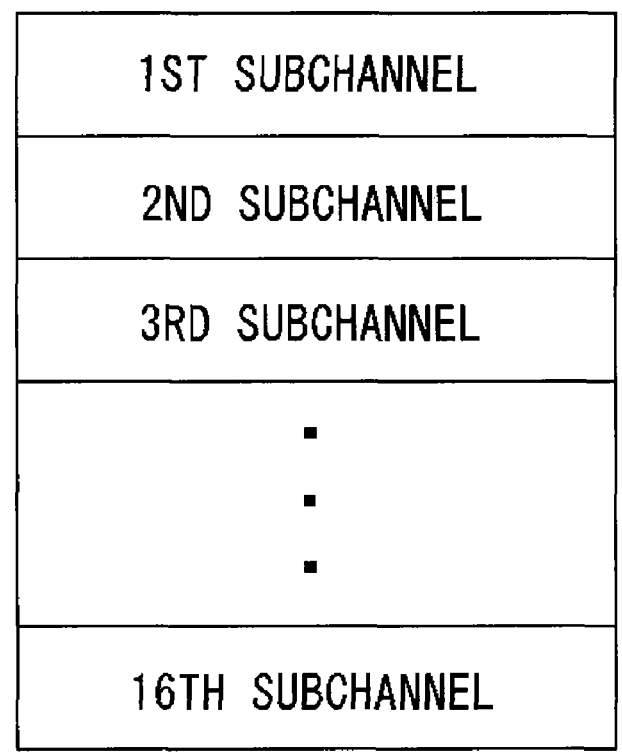
FIG. 12(b) illustrates a structure of a frame in a communication system according to a modification of the exemplary embodiment.
Figure 12C:
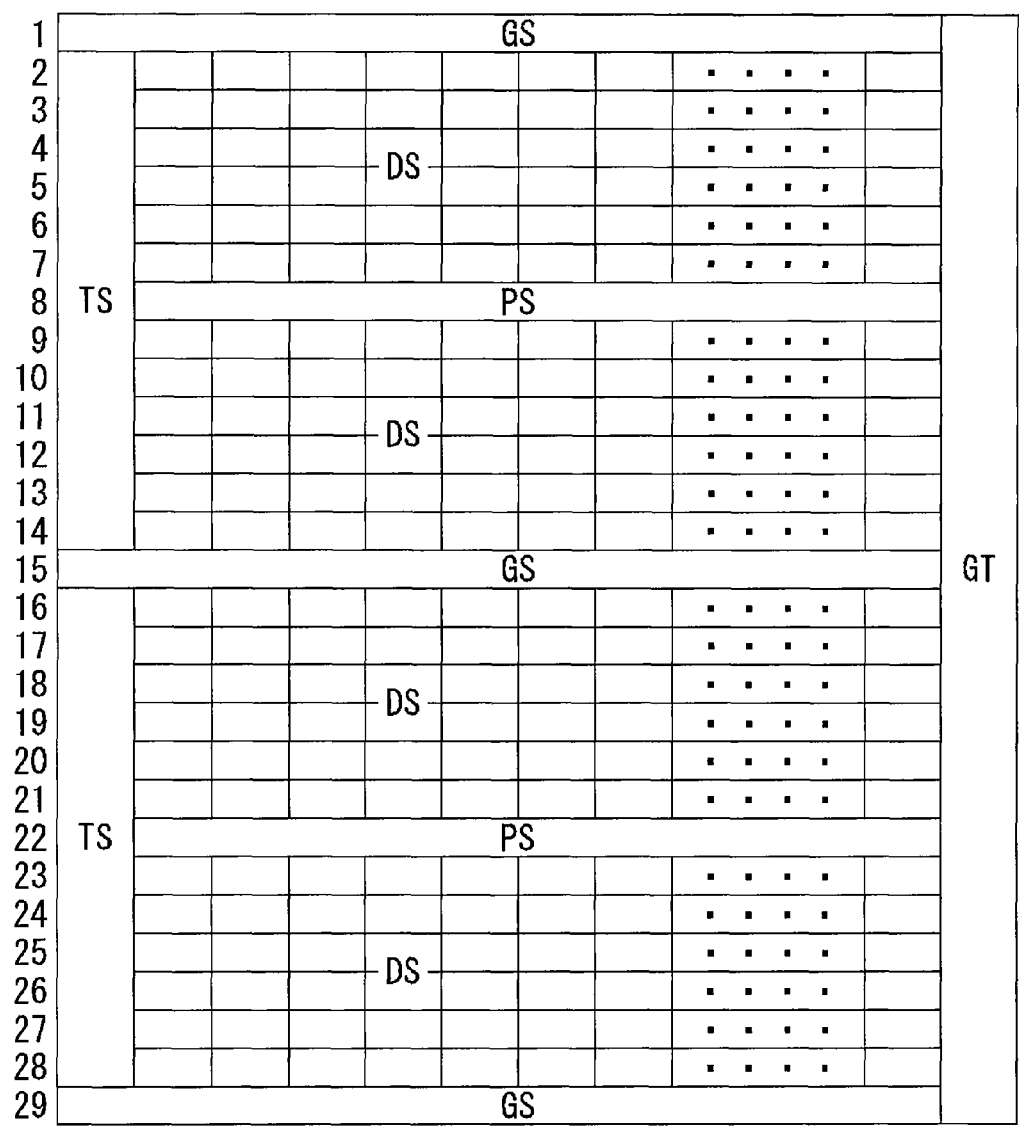

FIGS. 12(*a*) to 12(*c*) each shows a structure of a frame in the communication system 100 according to a modification of the exemplary embodiment. The horizontal direction in each of FIGS. 12(*a*) to 12(*c*) corresponds to time axis. A frame is constituted by eight time slots which are time-multiplexed. The eight time slots are composed of four uplink time slots and four downlink time slots. Here, the four uplink time slots are denoted as "first uplink time slot" through "fourth uplink time slot", whereas the four downlink time slots are denoted as "first downlink time slot" through "fourth downlink time slot". The frame as shown in each of FIGS. 12(*a*) to 12(*c*) is repeated contiguously. Note that the structure of a frame is not limited to that of FIG. 12(*a*) and, for example, a frame may be constituted by four time slots or sixteen time slots. For the clarity of explanation, a description will be given hereinbelow of the structure of a frame assuming that the frame is constituted as shown in FIG. 12(*a*). For the simplicity of explanation, the structure of an uplink time slot and that of a downlink time slot are identical to each other. Accordingly, if a description is given of the uplink time slots only or the downlink time slots only, the same description will be valid for the other time slots. Further, a plurality of contiguous frames form a super frame wherein each of the frames is one as shown in FIG. 12(*a*). Assume herein, for example, that a super frame is constituted by "twenty" frames.

FIG. 12(*b*) shows a structure of one of the time slots shown in FIG. 12(*a*). The vertical direction of FIG. 12(*b*) corresponds to the frequency axis. As shown in FIG. 12(*b*), one time slot is formed by frequency-multiplexing "16" subchannel blocks of "first subchannel" through "sixteenth subchannel". In FIG. 12(*b*), each subchannel block is denoted "subchannel". Since each time slot is constituted as shown in FIG. 12(*b*), a subchannel block is identified by the combination of a time slot and a subchannel. Also, a frame construction corresponding to one of the subchannels shown in FIG. 12(*b*) may be one shown in FIG. 12(*a*). Note that the number of subchannels assigned to each time slot may not be "16". Assume here that the allocation of subchannel blocks in the uplink time slots and the allocation of subchannel blocks in the downlink time slots are identical to each other. Assume also that at least one control signal is assigned to each super frame. For example, a control signal is assigned to a subchannel block in a time slot among a plurality of downlink time slots contained in a super frame. Assume here that the subchannel block to which the control signal is assigned is prescribed beforehand as with the first subchannel block.

FIG. 12(*c*) shows a structure of one of the subchannel blocks shown in FIG. 12(*b*). Similar to FIGS. 12(*a*) and 12(*b*), the horizontal direction thereof corresponds to the time axis, whereas the vertical direction thereof corresponds to the frequency axis. The numbers "1" to "29" are given along the frequency axis. These numbers indicate subcarrier numbers. In this manner, a subchannel block is constituted by multicarrier signals, in particular, OFDM signals. "TS" in FIG. 12(*c*) corresponds to a training signal, which is constituted by a known value. "GS" corresponds to a guard symbol and no substantial signal is assigned here. "PS" corresponds to a pilot symbol, which is constituted by a known value. "DS" corresponds to a data symbol, which is data to be transmitted. "GT" corresponds to a guard time and no substantial signal is assigned here.

Figure 13:
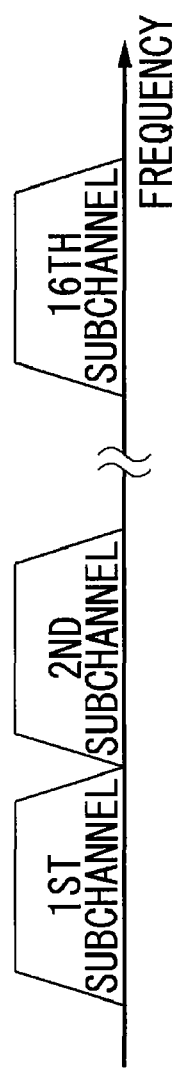
FIG. 13 illustrates an assignment of subchannels in a communication system according to a medication of the exemplary embodiment.

FIG. 13 shows an assignment of subchannels in the communication system 100 according to the modification of the exemplary embodiment. In FIG. 13, the horizontal axis represents the frequency axis and illustrates the spectrum for time slots shown in FIG. 12(*b*). As described above, sixteen sub-channels composed of the first subchannel to the sixteenth subchannel are frequency-division multiplexed in each time slot. Each subchannel is constituted by multicarrier signals, namely, OFDM signals here.

When, in the exemplary embodiment, beamforming is performed in the downlink, the terminal apparatus 16 transmits the sounding signal to the base station apparatus 10, which estimates the channel characteristics and then derives a weight vector based on the estimated channel characteristics. In the modification, too, the terminal apparatus 16 transmits the sounding signal to the base station apparatus 10 and then the base station apparatus 10 estimates the channel characteristics when beamforming is performed in the downlink. Also, the base station apparatus 10 derives a weight vector, based on the channel characteristics. Thus, the base station apparatus 10 may transmit a request for the transmission of the sounding signal, to the terminal apparatus according to the determined frequency.

A description is given below of another modification of the exemplary embodiment. In the description given so far, the base station apparatus 10 controls the timing with which the terminal apparatus 16 is to transmit the sounding signal. For example, the base station apparatus according to the exemplary embodiment controls the frequency at which the sounding region is assigned. For the communication system 100 such as a wireless LAN (Local Area Network) system according to another medication, a description is given of a case where the base station apparatus 10 does not control the timing with which the terminal apparatus 16 is to transmit the sounding signal. In the wireless LAN system, the base station apparatus 10 transmits a request for the transmission of the sounding signal (hereinafter referred to as "request signal"), to the terminal apparatus 16. On the other hand, the terminal apparatus 16, which has received the request signal, transmits the sounding signal to the base station apparatus 10. The structure of the communication system 100 according to the another modification is of a type similar to that of the communication system 100 of FIG. 1. Also, the structure of the base station apparatus 10 according to the another modification is of a type similar to that of the base station apparatus 10 of FIG. 3, and the structure of the terminal apparatus 16 according to the another modification is of a type similar to that of the terminal apparatus 16 of FIG. 8. In what is to follow, a description is mainly given of differences from the exemplary embodiment.

Similar to the above, the decision unit 36 determines the frequency at which the sounding signal is transmitted, based on the traveling speed acquired by the acquisition unit 34 and the threshold values stored in the storages 32. More specifically, the decision unit 36 determines the frequency, at which the request signal is transmitted, according to the traveling speed. For example, as the traveling speeds shifts from a low speed toward a medium speed, the decision unit 36 increases the frequency at which the request signal is transmitted. On the other hand, as the traveling speed shifts toward a high speed, the decision unit 36 stops transmitting the request signal. The baseband processing unit 22 transmits the request signal from the radio unit 20, according to the transmitting frequency determined by the decision unit 36. Upon receipt of the request signal, the terminal apparatus 16 transmits the sounding signal. Here, the sounding signal may be called a sounding packet, and it is structured such that the number of streams in LTF (Long Training Field) is greater than the number of streams in STF (Short Training Field).

FIGS. 14(a) to 14(c) each shows a transmit timing of packet in the communication system 100 according to the another modification of the exemplary embodiment. The horizontal axis in each of FIGS. 14(a) to 14(c) corresponds to the time axis. FIG. 14(a) corresponds to a high speed case; as shown in FIG. 14(a), packet signals 400 are contiguously transmitted in the downlink. For example, streaming data is transmitted through the packet signals 400. In this high speed case, however, request signals and sounding signals are not transmitted. FIG. 14(b) corresponds to a medium speed case; request signals 402 are transmitted, together with packet signals 400, in the downlink. Also, sounding signals 404 are transmitted, in the uplink, in response to the respective request signals 402. FIG. 14(c) corresponds to a high speed case. Similar to FIG. 14(b), packet signals 400 and request signals 402 are transmitted in the downlink, and sounding signals 404 are transmitted in the uplink. Comparing FIG. 14(b) with FIG. 14(c), it is found that the transmission interval between the request signals 402 and the transmission interval between the sounding signals 404 in FIG. 14(b) are shorter than those in FIG. 14(c). In other words, the transmitting frequency of the request signal 402 and the sounding signal 404 in FIG. 14(c) is higher than that in FIG. 14(b)

A description is given below of still another modification of the exemplary embodiment. Similar to the another modification, a description is below given of a wireless LAN system, as a communication system 100, according to the still another modification. The decision unit 36 determines the transmitting frequency of request signal and simultaneously determines the length of packet signal according to the traveling speed. The decision unit 36 determines in such a manner that the lower the traveling speed is, the longer the packet signal becomes. As a result, it is determined that the length of packet signal in a medium speed is made shorter than that in a low speed and that the transmitting frequency of request signal in the medium speed is higher than that in the low speed. Also, it is determined that the length of packet signal in a high speed is made shorter than that in a medium speed and that no request signal is transmitted in the high speed. FIGS. 15(a) to 15(c) each shows the transmit timing of packet in the communication system 100 according to the still another modification of the exemplary embodiment. FIGS. 15(a) to 15(c) correspond respectively to FIGS. 14(a) to 14(c); in FIGS. 15(a) to 15(c), the length of packet signal is variable according to the traveling speed.

According to the exemplary embodiment, the transmitting frequency of sounding signal is determined based on the traveling speed of the terminal apparatus, so that the transmitting frequency can be set according to the degree of variation in the channel characteristics. Since the transmitting frequency is set according to the degree of variation in the channel characteristics, the degradation of transmission efficiency can be suppressed by lowering the transmitting frequency if the speed is low. Also, since the transmitting frequency is set according to the degree of variation in the channel characteristics, the degradation of communication quality can be suppressed by increasing the transmitting frequency if the speed is high. Also, while the degradation of transmission efficiency is suppressed, the degradation of communication quality can be suppressed. Since the transmitting frequency of sounding signal is set to "0" when the traveling speed becomes high, the degradation of transmission efficiency can be suppressed. Also, since BF and MIMO are disabled, the degradation of communication quality is suppressed. Since the transmitting frequency of request signal is controlled according to the traveling speed, the present invention is applicable to the wireless LAN system. Also, since the length of packet signal is controlled according to the traveling speed, both an improvement in transmission rate and an improvement on error rate can be achieved.

The present invention has been described based on the exemplary embodiment and modifications. The exemplary embodiment and modifications are intended to be illustrative only, and it is understood by those skilled in the art that various modifications to constituting elements and processes could be further developed and that such modifications are also within the scope of the present invention.

In the exemplary embodiments and modifications of the present invention, the table stored in the storage 32 prescribes three stages of high speed, medium speed and low speed. However, this should not be considered as limiting and, for example, four or more stages may be defined for the traveling speed. Also, for each stage, the transmitting frequency need not be set to a fixed value but the transmitting frequency and the traveling speed may be related to each other such that the transmitting frequency increases as the speed increases. Even in such a case, the transmitting frequency is set such that MIMO and BF are disabled as the traveling speed becomes high. According to this modification, the transmitting frequency can be set in detail.

By employing this modification, the base station apparatus 10 acquires the traveling speed and determines the transmitting frequency. However, this should not be considered as limiting and, for example, the terminal apparatus 16 may carry out these processings instead. In such a case, the storage 32, the acquisition unit 34 and the decision unit 36 are included in the control unit 130 of the terminal apparatus 16. In other words, the acquisition unit 34 acquires a relative traveling speed between the base station apparatus 10 and the terminal apparatus 16, and the decision unit 36 determines the transmitting frequency according to the traveling speed. Also, the baseband processing unit 122 transmits the sounding signal, according to the transmitting frequency determined by the decision unit 36. In this case, MRQ (MCS Request) may be stored in the sounding signal. According to this modification, the present invention is applicable to various types of radio apparatuses.

INDUSTRIAL APPLICABILITY

The present invention suppresses the degradation of communication quality while suppressing the reduction in transmission efficiency.

What is claimed is:

1. A radio apparatus, comprising:
   an allocation unit configured to sequentially allocate a channel for use in data transmission and a channel for use in channel estimation used to acquire channel characteristics between said radio apparatus and another radio apparatus to be communicated therewith, to the another radio apparatus;
   a communication unit configured to communicate with the another radio unit through the data transmission channels sequentially allocated by said allocation unit, respectively; and
   an acquisition unit configured to acquire a relative traveling speed between said radio apparatus and the another radio apparatus communicating in said communication unit,
   wherein said communication unit varies the frequency at which the channel for use in channel estimation is allocated, based on the relative traveling speed acquired by said acquisition unit.

2. A radio apparatus according to claim 1, wherein said communication unit defines a relation in response to an increase in traveling speed such that when the traveling speed is less than a threshold value, the frequency increases and such that when the traveling speed is greater than or equal to the threshold value, the frequency decreases, and
   said communication unit determines the frequency based on the relation and the traveling speed acquired by said acquisition unit.

3. A radio apparatus according to claim 1, wherein said communication unit varies the frequency of use of burst signal transmitted from the another radio apparatus to said radio apparatus, instead of the allocation of the channel for use in data transmission, according to the traveling speed acquired by said acquisition unit,
   wherein the burst signal contains an estimation result of the channel characteristics.

4. A communication method, comprising:
   allocating sequentially a channel for use in data transmission and a channel for use in channel estimation used to acquire channel characteristics between a radio apparatus and another radio apparatus to be communicated therewith, to the another radio apparatus;
   communicating with the another radio unit through the data transmission channels sequentially allocated, respectively;
   acquiring a relative traveling speed between the radio apparatus and the another radio apparatus communicating with the radio apparatus; and
   varying the frequency at which the channel for use in channel estimation is allocated, based on the acquired relative traveling speed.

* * * * *